US006518748B2

(12) United States Patent
Butzmann et al.

(10) Patent No.: US 6,518,748 B2
(45) Date of Patent: Feb. 11, 2003

(54) METHOD FOR DETERMINING THE POSITION OF AN ARMATURE

(75) Inventors: Stefan Butzmann, Hagen (DE); Joachim Melbert, Deisenhofen (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 09/968,730

(22) Filed: Oct. 1, 2001

(65) Prior Publication Data

US 2002/0097120 A1 Jul. 25, 2002

Related U.S. Application Data

(63) Continuation of application No. PCT/DE00/00676, filed on Mar. 3, 2000.

(30) Foreign Application Priority Data

Mar. 30, 1999 (DE) ........................................ 199 14 467

(51) Int. Cl.[7] ............................ G01B 7/00; H01F 7/18; F01L 9/04

(52) U.S. Cl. ............................ 324/207.16; 324/207.24; 123/617

(58) Field of Search ........................ 324/207.16, 207.24, 324/654, 655, 656, 657; 702/158; 361/160; 123/617

(56) References Cited

U.S. PATENT DOCUMENTS 5,481,187 A 1/1996 Marcott et al.

FOREIGN PATENT DOCUMENTS

| | | |
|---|---|---|
| DE | 195 01 766 A 1 | 7/1996 |
| DE | 195 26 683 A 1 | 1/1997 |
| DE | 195 33 452 A 1 | 3/1997 |
| DE | 195 35 211 A 1 | 3/1997 |
| DE | 195 44 207 A 1 | 6/1997 |
| EP | 0 493 634 A1 | 7/1992 |

*Primary Examiner*—Walter E. Snow
(74) *Attorney, Agent, or Firm*—Laurence A. Greenberg; Werner H. Stemer; Ralph E. Locher

(57) ABSTRACT

An electromechanical actuating drive includes at least one electromagnet with a coil and an armature having an armature plate that can move between a first contact surface on the electromagnet and a second contact surface. The position of the armature is determined as a function of the magnetic flux (Φ) and the current ($I_S$) through the coil.

4 Claims, 4 Drawing Sheets

METHOD FOR DETERMINING THE POSITION OF AN ARMATURE

CROSS-REFERENCE TO RELATED APPLICATION

This application is a continuation of copending International Application No. PCT/DE00/00676, filed Mar. 3, 2000, which designated the United States.

BACKGROUND OF THE INVENTION

Field of the Invention

The invention relates to a method for determining the position of an armature that is associated with an electromechanical actuating drive. The actuating drive is associated with an actuator, which preferably has a gas inlet or outlet valve of an internal combustion engine as the actuating element.

A prior art actuator is described in German Published, Non-Prosecuted Patent Application DE 195 26 683 A1, corresponding to U.S. Pat. No. 5,691,680 to Schrey et al. The actuator has a gas inlet or outlet valve and an actuating drive. The actuating drive has two electromagnets, between which an armature plate can be moved, in each case against the force of a resetter or resetting means. The armature plate can be moved by switching off the coil current on the holding electromagnet, and switching on the coil current on the attracting electromagnet. The coil current of the respectively attracting electromagnet is kept constant throughout a predetermined time period by a predetermined attraction value, and is then controlled to a holding value by a two-point regulator with hysteresis.

In order to determine the position of the armature plate, European Patent Application EP 0 493 634 A1, corresponding to U.S. Pat. No. 5,072,700 to Kawamura, discloses an optical sensor disposed in the electromagnet that detects the position of the armature plate. However, such a sensor requires space, which is available only to a very restricted extent, and requires costly wiring.

German Published, Non-Prosecuted Patent Application DE 195 44 207 A1 discloses measuring the magnetic flux that produces the magnetic force and the current through the field winding of an electromagnetic actuator to determine an armature movement. The movement variables including the armature movement, the armature speed, and/or the armature acceleration are calculated based on matched physical equations from the magnetic flux and from the current through the field winding, and are used as control variables for controlling the movement of the armature. However, Application DE 195 44 207 A1 contains no information on how the resistance of the field winding can be determined reliably for such a purpose.

SUMMARY OF THE INVENTION

It is accordingly an object of the invention to provide a method for determining the position of an armature that overcomes the hereinafore-mentioned disadvantages of the heretofore-known methods and devices of this general type and that provides a simple and reliable method for determining the position of an armature.

With the foregoing and other objects in view, there is provided, in accordance with the invention, a method for determining the position of an armature associated with an electromechanical actuating drive, the actuating drive having a first contact surface, at least one electromagnet with a coil and a second contact surface, the armature having an armature plate movably disposed between the first contact surface and the second contact surface, the method including the steps of determining a mean value of a measured voltage drop across a coil in an operating state in which a substantially constant current is flowing through the coil, determining a resistance of the coil as a function of the mean value of the measured voltage drop and the current through the coil, determining an inductive voltage drop across the coil from a difference between the measured voltage drop across the coil minus a voltage drop obtained by multiplication of the resistance of the coil by the current through the coil, determining a magnetic flux by integration of the inductive voltage drop across the coil, and determining a position of an armature as a function of the magnetic flux and the current through the coil.

In accordance with another mode of the invention, the mean value of the measured voltage drop across the coil is determined when a ratio of a change in a position to the position is less than a predetermined threshold value throughout a predetermined measurement time period.

In accordance with a concomitant mode of the invention, the mean value of the measured voltage drop across the coil is determined when a ratio of a distance between the armature plate and the second contact surface to a distance between the first contact surface and the second contact surface is greater than a predetermined threshold value throughout a predetermined measurement time period.

In a magnetic circuit that is formed by a coil, a core, an armature plate, and the air gap between the armature plate and the core, and provided the stray flux is negligible and the magnetic circuit is not saturated, the magnetic flux depends only on the current through the coil, and on the position of the armature plate. The magnetic flux Φ is represented by the equation:

$$\Phi = \frac{1}{N}\int_0 U_L(\tau)d\tau, \quad (1)$$

where $U_L$ is the inductive voltage drop across the coil, which is advantageously given by the difference between the measured voltage drop across the coil minus the voltage drop that is obtained by multiplication of the resistance of the coil by the current through the coil.

The magnetic flux Φ is represented by the equation:

$$\Phi = \frac{N \cdot I_s}{\frac{1}{\mu_0} \cdot \frac{2(s-K)}{A}}, \quad (2)$$

where:

A is the contact surface area of the core of the electromagnet with which the armature plate makes contact;

N is the number of turns on the coil;

$I_S$ is the current through the coil;

s is the position of the armature plate;

$\mu_o$ is the permeability of air; and

K is a constant. The position s is equal to the sum of the constant K and the length of the air gap between the armature plate and the core.

Equating equations (1) and (2) and solving for the position s produces the equation:

$$s = \frac{\mu_0 A N^2}{2} \cdot \frac{I_s}{\int_0 U_L(\tau)d\tau} + K \quad (3)$$

If equation (1) is substituted in equation (3), the resulting equation is:

$$s = \frac{\mu_0 A N}{2\Phi} \cdot I_s + K \quad (4)$$

Equation (4) allows the position of the armature plate to be determined, as a function of the magnetic flux and the current through the coil, in a simple manner.

Other features that are considered as characteristic for the invention are set forth in the appended claims.

Although the invention is illustrated and described herein as embodied in a method for determining the position of an armature, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 1:
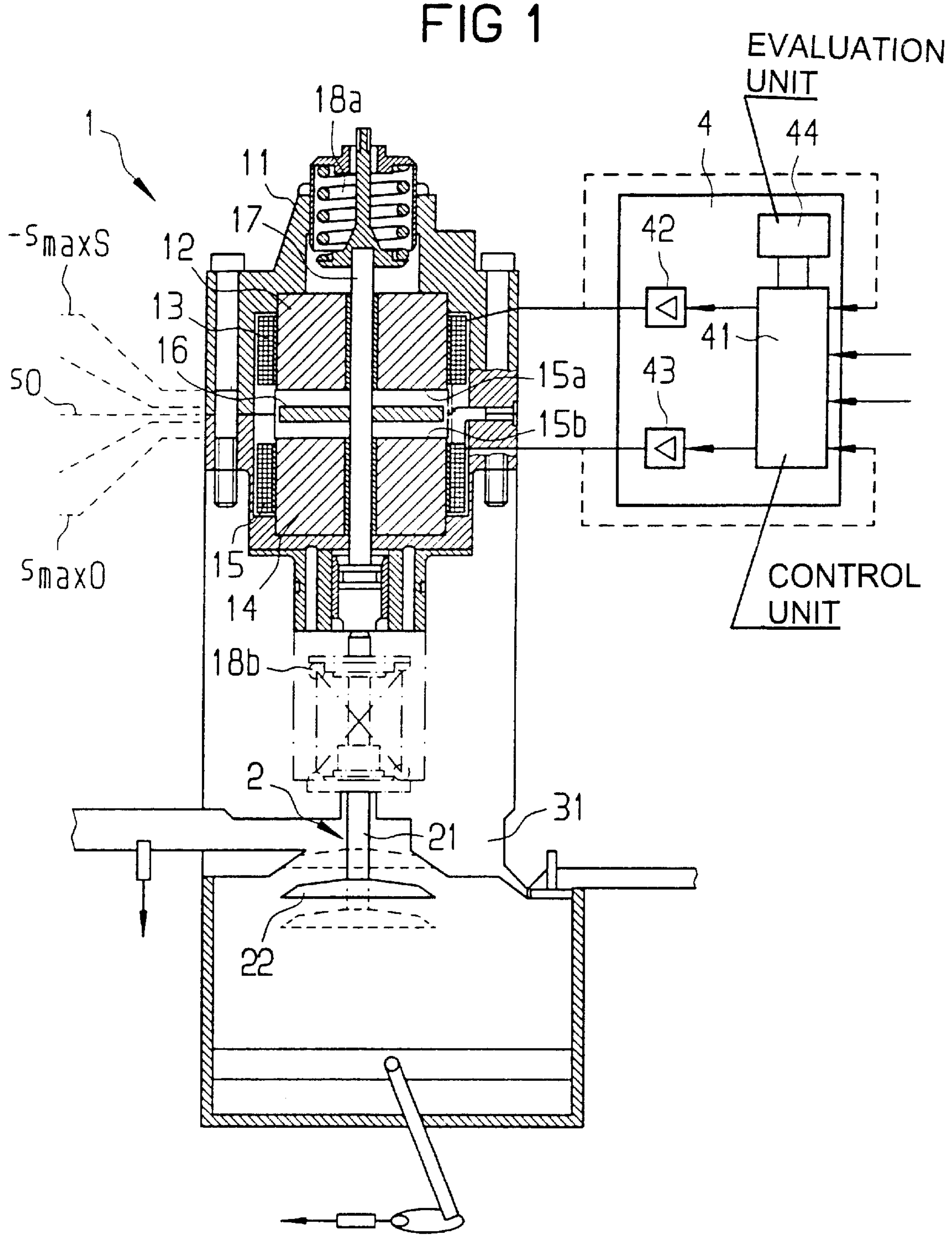
FIG. 1 is a fragmentary, cross-sectional view of an actuating drive and a control device in an internal combustion engine according to the invention.

Referring now to the figures of the drawings in detail and first, particularly to FIG. 1 thereof, there is shown an actuator having an actuating drive 1 and an actuating element, which is preferably in the form of a gas inlet or outlet valve 2. The gas inlet or outlet valve 2 has a stem 21 and a plate 22. The actuating drive 1 has a housing 11, in which a first and a second electromagnet are disposed. The first electromagnet has a first core 12, which is provided with a first coil 13. The second electromagnet has a second core 14, which is provided with a second coil 15. An armature is provided, whose armature plate is disposed in the housing 11 such that it can move between a first contact surface 15*a* on the first electromagnet, and a second contact surface 15*b* on the second electromagnet. Thus, the armature plate 16 can move between a closed position $S_{maxS}$ and an open position $S_{max0}$. The armature furthermore has an armature shaft 17, which is passed through cutouts in the first and second cores 12, 14, and can be mechanically coupled to the stem 21 of the gas inlet or outlet valve 2. A first resetting device or means for resetting 18*a* and a second resetting device or means for resetting 18*b*, which are preferably in the form of springs, prestress the armature plate 16 to the predetermined rest position s0.

The actuation drive 1 is rigidly connected to the cylinder head 31, and to a non-illustrated internal combustion engine.

A control device 4 that detects signals from sensors preferably communicates with a non-illustrated higher-level control device for engine operating functions, and receives control signals from the device. The control device 4 controls the first and second coils 13, 15 of the actuating drive 1 as a function of the signals from the sensors and the control signal.

The control device 4 has a control unit 41 in which the actuating signals for the coils 13, 15 are determined, and has a first power output stage 42 and a second power output stage 43. Furthermore, the control device 4 has an evaluation unit 44, in which the resistance of the coils 13, 15 and the position of the armature plate 16 are determined. The first power output stage 42 and the second power output stage 43 amplify the actuating signals.

The control unit 41 has a first regulator, whose reference variable is the current, or a voltage that corresponds to the current, through the first coil 13. A higher-level regulator may also be provided that produces the reference variable for the first regulator as a function of the position of the armature plate. The control unit 41 furthermore has a second regulator, whose control variable is the current through the second coil 15, or a corresponding voltage, and that produces corresponding control signals for driving the power output stages.

The first electromagnet and the second electromagnet are disposed symmetrically with respect to the rest position of the armature plate in the actuating drive 1. The first and second regulators differ only in that the first regulator controls the current through the first coil 13, and the second regulator controls the current through the second coil. The first power output stage 42 and the second power output stage 43 are of identical construction, and their components have an identical circuit configuration. They differ only in that the first power output stage is intended for driving the first coil 13, and the second power output stage 43 is intended for driving the second coil 15. In the same way, those elements that are disposed in the evaluation unit 44 are provided respectively for the first electromagnet and for the second electromagnet, although their functions are identical.

Figure 2:
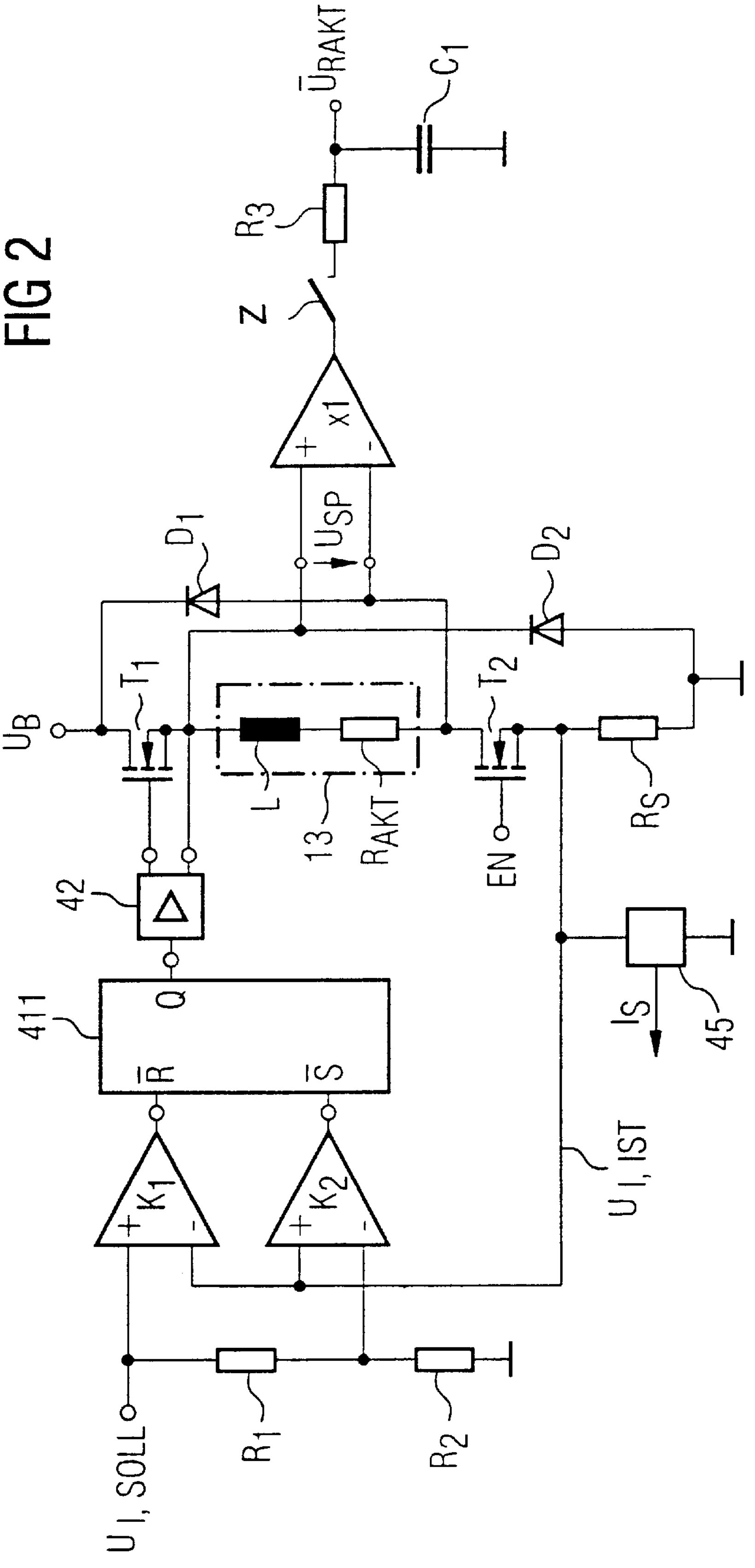
FIG. 2 is a schematic and block circuit diagram of the control device of FIG. 1.

A circuit configuration of FIG. 2 in the control device 4 has a two-point regulator, which has a first resistor R1, a second resistor R2, a first comparator $K_1$ and a second comparator $K_2$, as well as an RS-flip-flop 411. The output Q of the RS-flip-flop 411 is connected to the first power output stage 42, whose output is connected to the control input of a first power transistor $T_1$. A half-bridge circuit configuration includes the first transistor $T_1$, a second transistor $T_2$, a measurement resistor $R_S$, and diodes $D_1$ and $D_2$ and is electrically conductively connected to the coil 13, whose inductance is L and whose resistance is $R_{AKT}$. The diode $D_2$ is a freewheeling diode.

When the transistor $T_2$ is switched on, the current $I_s$ through the coil 13 is detected, and is proportional to an actual value $U_{ACT}$ of the voltage potential at the tap on the current measurement resistor $R_S$. Furthermore, a current measurement device 45 is provided, which produces a signal that represents the current $I_S$ through the coil 13.

The switching threshold of the first comparator K1 is the nominal value $U_{I,nom}$ of the voltage potential at the tap on the current measurement resistor $R_S$. The switching threshold of the second comparator K2 is the nominal value $U_{I,nom}$ of the voltage potential of the tap on the current measurement resistor $R_S$ multiplied by the ratio of the resistance $R_2$ to the sum of the resistances $R_1$ and $R_2$. Accordingly, the Q-output of the RS-flip-flop 411 is set to a low potential as soon as the actual value is greater than or equal to the nominal value of the voltage potential at the tap on the current measurement resistor $R_S$. The Q-output of the RS-flip-flop 411 is set to a high potential as soon as the actual value is less than or equal to the ratio of the resistance $R_2$ to the sum of the resistances $R_1$ and $R_2$ multiplied by the nominal value $U_{I,nom}$ of the voltage potential at the tap on the current measurement resistor $R_S$.

The output stage 42 amplifies the output signal Q from the RS-flip-flop 411, and, thus, drives the transistor $T_1$. If both the transistors $T_1$ and $T_2$ are switched on, then the entire supply voltage $U_B$ is dropped across the coil 13. If the transistor $T_1$ is then switched off, then the diode D2 is forward-biased such that it freewheels, and only the forward voltage across the diode D2 is dropped across the coil 13.

Furthermore, a differential amplifier X1 taps off the voltage drop $U_{SP}$ across the coil 13.

The output of the differential amplifier X1 is passed through a switch Z to a low-pass filter having a resistor $R_3$ and a capacitor $C_1$, and at whose output the mean voltage drop $\overline{U}_{RAKT}$ across the coil 13 is produced.

Figure 3:
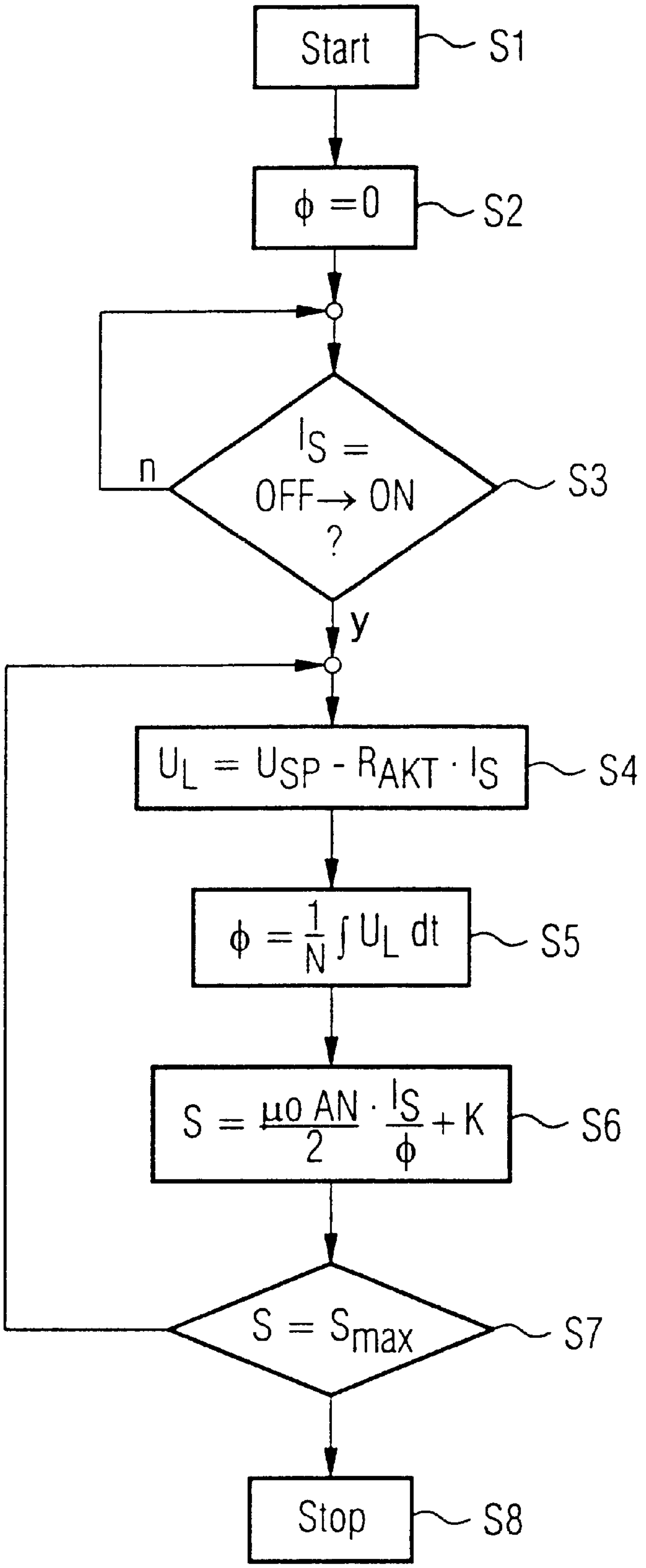
FIG. 3 is a flowchart of a program for determining a position of the armature plate of FIG. 1.

A program for determining the position of the armature plate 16 and of the armature will be described in the following text with reference to the flowchart shown in FIG. 3. The method starts in a step S1. The magnetic flux Φ through the coil 13 is initialized to the value zero in a step S2. A check is carried out in a step S3 to determine whether or not current has started to flow through the coil. The check is performed by checking whether or not the current $I_S$ through the coil has changed from a zero value OFF to any other current value ON since the program last passed through the step S3. If the condition in step S3 is satisfied, then the processing is continued in a step S4. However, if the condition in step S3 is not satisfied, another check is carried out after waiting for a predetermined time.

The inductive voltage drop $U_L$ across the coil 13 is determined, in step S4, from the difference between the voltage drop $U_{SP}$ and the product of the resistance $R_{AKT}$ of the coil 13 and the current $I_S$ through the coil 13. Thus, it is easily possible to determine the inductive voltage drop $U_L$ from the measured variables including the current $I_S$ through the coil and the voltage drop $U_{SP}$ across the coil. The resistance $R_{AKT}$ of the coil 13 is either stored as a fixed predetermined value in the evaluation device, or is preferably determined by a program as set forth in FIG. 4, with the advantage that the resistance can be determined with high accuracy regardless of the operating temperature and the operating duration of the actuating drive.

The magnetic flux Φ is then determined in accordance with equation (1) in a step S5. In the determination, a numerical integration method is preferably used to calculate the instantaneous magnetic flux Φ from the magnetic flux Φ when the program last passed through the step S5, the instantaneous inductive voltage drop $U_L$ and the time period between the successive calculation runs through step S5.

The position s of the armature plate 16 is determined, in accordance with equation (4), in a step S6. A check is carried out in step S7 to determine whether or not the position s is the same as the open position $S_{MAX,O}$. If the check is positive, then the program is ended in a step S8. Otherwise the program is continued in step S4.

The condition in step S3 ensures that the position S is determined whenever the armature plate 16 is moving toward the coil 13. The characteristic ensures that it is possible to determine the position s particularly accurately in the region shortly before the armature plate 16 actually strikes the first contact surface 15*a*.

If the armature plate 16 is moving from the first contact surface 15*a* toward the second contact surface 15*b*, then a corresponding program is started to determine the position s, and evaluates the coil current through the second coil 15, the inductive voltage drop across the second coil 15, and the resistance of the second coil.

A program for determining the resistance $R_{AKT}$ of the first coil 13 is started in a step S15. A check is carried out in a step S16 to determine whether or not the position s of the armature plate is the same as the closed position $S_{MAXS}$ or is the same as the open position $S_{MAXO}$, or the distance between the armature and the coil to be evaluated (in this case the first coil 13) is greater than or equal to half the distance between the closed position $S_{MAXS}$ and the open position $S_{MAXO}$. If one of these conditions is satisfied, then it is ensured that the inductance L of the coil 13 changes only to a negligible extent. If one of the first two conditions is satisfied, then it is ensured that the armature plate is at rest and that the inductance of the coil 13 will, thus, remain unchanged through the rest of the program run to determine the resistance. If the third condition is satisfied, then it is ensured that the distance between the armature plate 16 and the first contact surface 15*a* is sufficiently large that, if the armature plate 16 moves toward the second contact surface 15*b*, the inductance of the coil 13 will remain virtually unchanged. If none of the conditions in step S16 are satisfied, then step S16 is carried out once again after waiting for a predetermined time. If, however, one of the conditions in step S16 is satisfied, then a check is carried out in a step S17 to determine whether or not the current $I_S$ through the coil 13 is approximately constant. Such is the case, for example, when the armature plate 16 is in contact with the first contact surface, and a constant holding current is being controlled to flow through the coil. However, it is also possible for there to be a constant current level through the coil if the position of the armature plate is the same as the open position $S_{MAXO}$.

If the condition in step S17 is satisfied, then the switch Z is closed (Z=ON) in a step S18. In such a state, the output of the differential amplifier X1 is electrically conductively connected to the low-pass filter formed by the resistor $R_3$ and the capacitor $C_1$.

A step S19 results in a wait for a predetermined measurement time period Δt. The switch Z is then opened once again (Z=OFF) in a step S20. The mean value $\overline{U}_{RAKT}$ of the voltage drop across the coil over the measurement time period Δt is then determined at the output of the low-pass filter. Because the condition for processing steps S18 to S20 is that the current $I_S$ through the coil is approximately constant, that is to say, at least the mean value of the current $I_S$ is constant throughout the measurement time period, the mean inductive voltage drop across the coil is equal to zero. The instantaneous resistance $R_{AKT}$ is calculated accordingly, using the following relation:

$$R_{AKT}=\overline{U}_{RAKT}/I_S \qquad (5)$$

Figure 4:
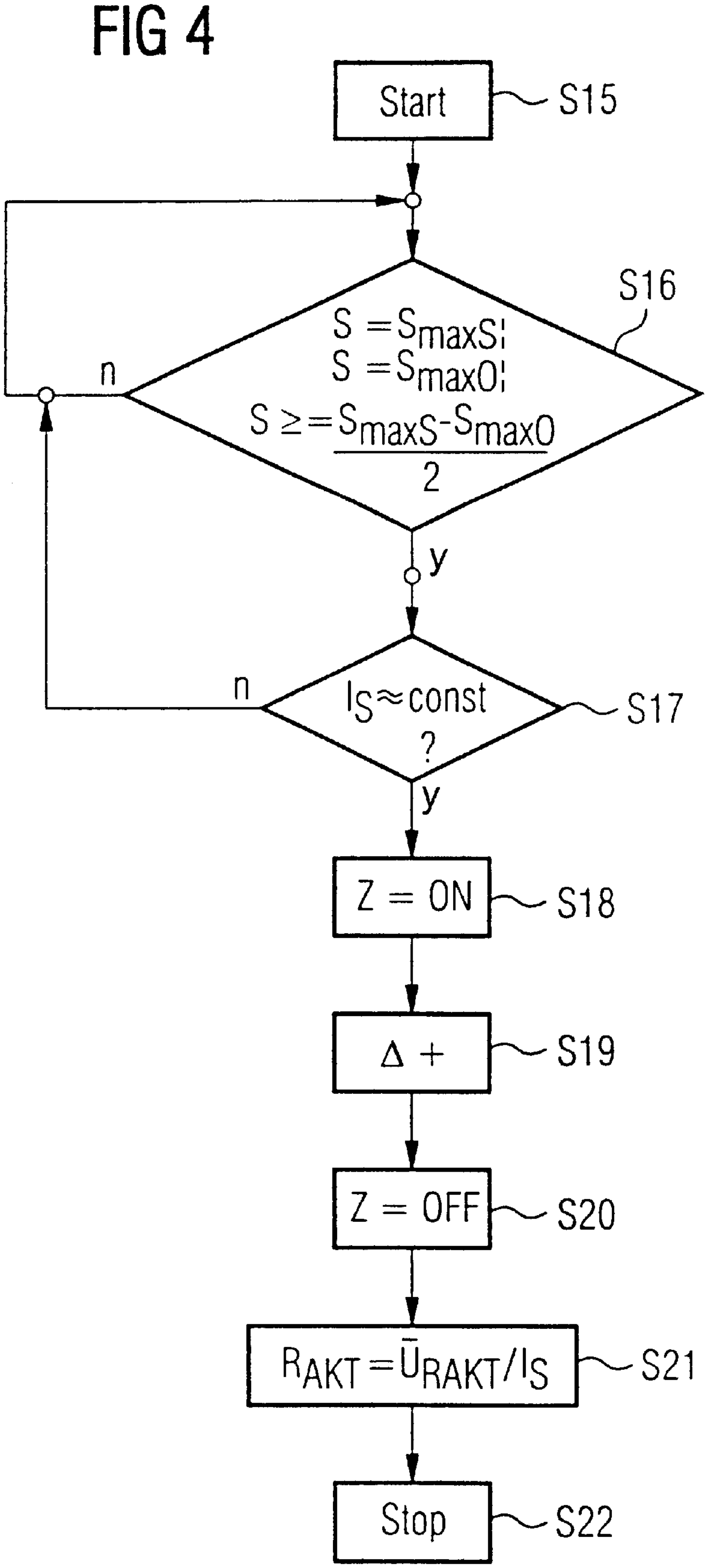
FIG. 4 is a flowchart of a program for determining the resistance of the coil of FIG. 1.

The program is stopped in a step S22. The program procedure shown in FIG. 4 has the advantage that the instantaneous resistance $R_{AKT}$ of the coil 13 can be determined very accurately at any time during operation of the actuating drive. In such a case, the program shown in FIG. 4 is preferably carried out once again at fixed predetermined time intervals throughout operation of the actuating drive 1.

If the current $I_S$ through the coil 13 has a known predetermined value when carrying out steps S15 to S22, there is no need to detect the current $I_S$, and the resistance can be determined in step S21 using a stored value IS of the current.

We claim:

1. A method for determining the position of an armature associated with an electromechanical actuating drive, the actuating drive having a first contact surface and at least one electromagnet with a coil and a second contact surface, the armature having an armature plate movably disposed between the first contact surface and the second contact surface, the method which comprises:

determining a mean value of a measured voltage drop across a coil in an operating state in which a substantially constant current is flowing through the coil;

determining a resistance of the coil as a function of the mean value of the measured voltage drop and the current through the coil;

determining an inductive voltage drop across the coil from a difference between the measured voltage drop across the coil minus a voltage drop obtained by multiplication of the resistance of the coil by the current through the coil;

determining a magnetic flux by integration of the inductive voltage drop across the coil; and determining a position of an armature as a function of the magnetic flux and the current through the coil.

2. The method according to claim 1, which further comprises determining the mean value of the measured voltage drop across the coil when a ratio of a change in a position to the position is less than a predetermined threshold value throughout a predetermined measurement time period.

3. The method according to claim 1, which further comprises determining the mean value of the measured voltage drop across the coil when a ratio of a distance between the armature plate and the second contact surface to a distance between the first contact surface and the second contact surface is greater than a predetermined threshold value throughout a predetermined measurement time period.

4. A method for determining the position of an armature associated with an electromechanical actuating drive, which comprises:

providing an electromechanical actuating drive having an armature, a first contact surface, at least one electromagnet with a coil and a second contact surface, the armature having an armature plate movably disposed between the first contact surface and the second contact surface;

determining a mean value of a measured voltage drop across the coil in an operating state in which a substantially constant current is flowing through the coil;

determining a resistance of the coil as a function of the mean value of the measured voltage drop and the current through the coil;

determining an inductive voltage drop across the coil from a difference between the measured voltage drop across the coil minus a voltage drop obtained by multiplication of the resistance of the coil by the current through the coil;

determining a magnetic flux by integration of the inductive voltage drop across the coil; and determining a position of the armature as a function of the magnetic flux and the current through the coil.

* * * * *